US012651948B2

(12) United States Patent
Herrmann

(10) Patent No.: US 12,651,948 B2
(45) Date of Patent: Jun. 9, 2026

(54) METHOD FOR PRODUCING AN ELECTROMAGNET

(71) Applicant: AUDI AG, Ingolstadt (DE)

(72) Inventor: Patrick Herrmann, Pfaffenhofen (DE)

(73) Assignee: Audi AG, Ingolstadt (DE)

( * ) Notice: Subject to any disclaimer, the term of this patent is extended or adjusted under 35 U.S.C. 154(b) by 303 days.

(21) Appl. No.: 18/444,101

(22) Filed: Feb. 16, 2024

(65) Prior Publication Data

US 2024/0283339 A1 Aug. 22, 2024

(30) Foreign Application Priority Data

Feb. 22, 2023 (DE) .......................... 102023104290.4

(51) Int. Cl.
| | |
|---|---|
| *H02K 15/095* | (2006.01) |
| *H01F 41/02* | (2006.01) |
| *H01F 41/06* | (2016.01) |
| *H02K 1/24* | (2006.01) |

(52) U.S. Cl.
CPC ......... *H02K 15/095* (2013.01); *H01F 41/024* (2013.01); *H01F 41/06* (2013.01); *H02K 1/24* (2013.01)

(58) Field of Classification Search
CPC .......... H02K 1/12; H02K 15/02; H02K 33/16; H02K 11/02; H02K 3/52; H02K 11/40; H02K 19/12; H02K 3/18; H02K 1/24; H02K 15/095; H01F 41/024; H01F 41/077; H01F 41/06
See application file for complete search history.

(56) References Cited

U.S. PATENT DOCUMENTS

| | | | | |
|---|---|---|---|---|
| 5,982,056 A | * | 11/1999 | Koyama | ................. C08L 63/00 |
| | | | | 310/43 |
| 9,559,573 B2 | * | 1/2017 | Baba | .................... H02K 15/105 |
| 10,090,793 B2 | | 10/2018 | Liu et al. | |

FOREIGN PATENT DOCUMENTS

| | | |
|---|---|---|
| DE | 10202476 A1 | 8/2003 |
| DE | 102012205755 A1 | 10/2013 |
| DE | 102012103828 A1 | 11/2013 |
| DE | 102014119513 A1 | 7/2015 |
| EP | 1035631 A2 | 9/2000 |
| WO | 2009/150357 A2 | 12/2009 |

\* cited by examiner

*Primary Examiner* — Leda T Pham
(74) *Attorney, Agent, or Firm* — Seed Intellectual Property Law Group LLP

(57) ABSTRACT

A method for producing an electromagnet from a metal core and at least one metal wire is disclosed and may include joining a plurality of metal plates into the metal core by packing and winding at least one metal wire around the assembled metal core. Each metal plate may include plastically shaped areas and the plastically shaped areas of the metal plate may be connected by force-locking and/or form-fitting to the plastically shaped area of at least one adjacent metal plate in a joining direction. A multitude of windings may be wound around the metal core. The windings may be placed next to each other and/or on top of one another and a partial region of each winding may be oriented parallel to the joining direction. Furthermore, an electromagnet produced according to the method and a rotor of an electric machine having at least one electromagnet are disclosed.

11 Claims, 1 Drawing Sheet

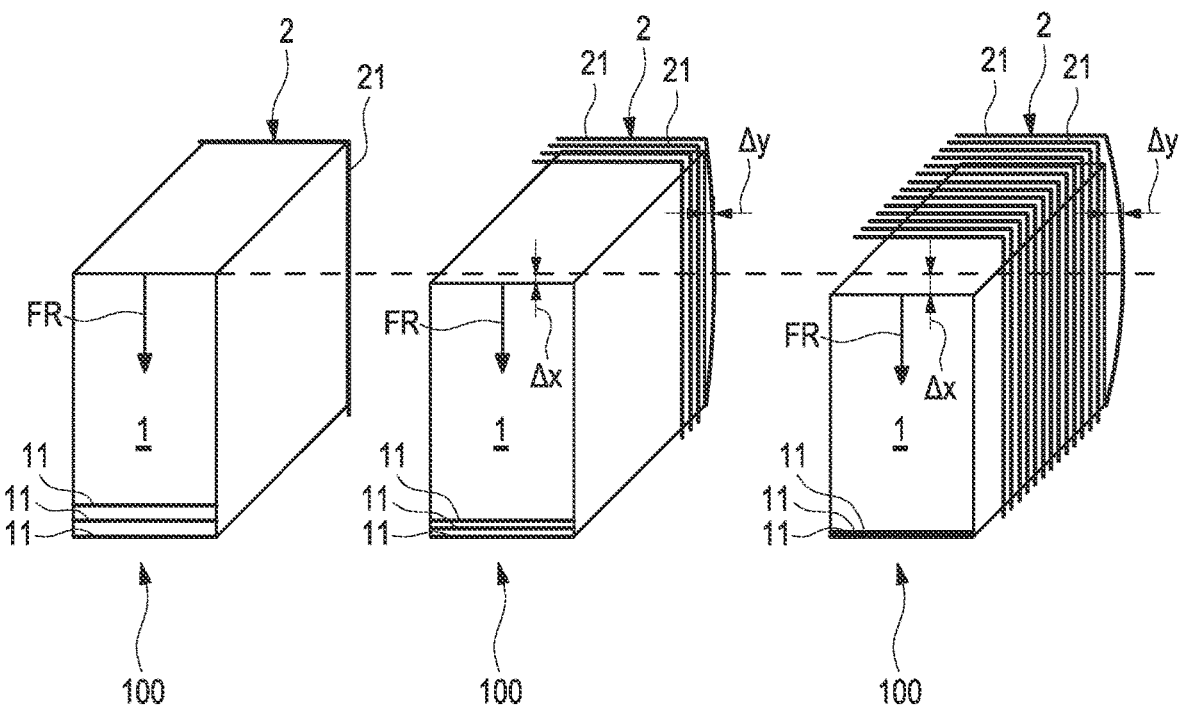

METHOD FOR PRODUCING AN ELECTROMAGNET

BACKGROUND

Technical Field

The present disclosure relates to production of an electromagnet, specifically production of an electromagnet for a rotor of an electric machine.

Description of the Related Art

Electromagnets are used in various applications in technology. Among other things, electromagnets may be used in electric machines or electric motors, where they generate a magnetic field in the stator or rotor. For example, the rotor poles in an externally excited synchronous machine may be formed by electromagnets. Electromagnets comprise a metal core, which may be formed by an iron-containing metal. The metal core is wound with an electrically conductive wire, which may contain copper. The metal core may include individual metal plates stacked on one another, each of them being electrically insulated from each other. In this way, the electrical power loss may be reduced, such as by eddy currents inside the metal core in the case of a single-piece metal core. The metal plates stacked on one another may also be known as a sheet metal pack. Various methods are known for combining multiple metal plates to form a metal core. For example, the metal plates may be glued to each other. However, such a joining process by gluing may be expensive. Preferably, therefore, the metal plates may be joined together by stamping. In this case, connection elements may be embossed in the metal plates and metal plates situated adjacent to each other may be joined together by these connection elements. This production method may also be known as punch packing. The benefit of this method for production of the metal core is that it may be integrated in a process that is necessary for the cutting out of the metal plates. Furthermore, no additional materials, such as adhesive, are needed for the connecting of the plates. However, a metal core produced by stamping from multiple metal plates is, to a certain degree, elastic in the direction perpendicular to the individual metal plates, due to the form-fitting and force-locking connection sites resulting in slight distances between the joined metal plates. In such a configuration, the connection sites act as springs when a force is applied perpendicular to the metal plates. Such a force may be produced, for example, when the metal core is wrapped with a metal wire in order to produce an electromagnet. When the first winding is applied, the metal core is elastically compressed, such that its outer dimensions are reduced. After a number of windings, there no longer exists any distance between the individual plates and the outer dimensions of the metal core remain constant. However, due to the reduction of the outer dimensions of the metal core during the winding process, the first windings may be installed loose and the metal wire may be spaced apart from the metal core in the case of these windings. This makes it difficult to apply windings in a second layer.

DE 102012205755A1 discloses a method for production of a rotor for a rotating electric machine. In the disclosed method, metal wires wrapped around a metal core are encased in a bonding agent after the wrapping, which is then hardened at elevated temperature in order to fix the windings in place. An electric current is applied to the metal wire in order to create the high temperature needed for the hardening.

DE 102014119513A1 discloses an electric motor and a compressor. The electric motor comprises at least one heating element in its rotor, which is provided for the heating of the metal core during operation of the motor. The heating element may be designed as a resistance heater.

WO 2009150357A2 discloses a rotor for a multipolar electric synchronous machine. In order to produce the rotor, a metal wire having a coating of baked enamel is used, which is first wound around a metal core and then fixed in place by bonding under pressure and the action of heat.

BRIEF SUMMARY

The present disclosure provides windings of metal wire applied to a multilayered metal core which may be stabilized in their position in a simplified manner.

This present disclosure describes a method for producing an electromagnet from a metal core and at least one metal wire which may include the steps:

A) providing a plurality metal plates;

B) joining the metal plates into a metal core by packing, wherein each metal plate is plastically shaped in some areas and the shaped region of the metal plate is connected by force-locking and/or form-fitting to the shaped region of at least one adjacent metal plate in a joining direction; and C) winding of at least one metal wire around the assembled metal core, wherein a multitude of windings are wound around the metal core, the windings being placed next to each other and/or on top of one another and wherein a partial region of each winding is oriented parallel to the joining direction, wherein the metal wire prior to the winding process in step C) is heated and its length is increased by the heating.

In the method provided in the present disclosure, a metal wire is applied on a metal core, the metal core having partly elastic properties in at least one direction. The method may be used for the production of an electromagnet. Furthermore, the method may also be used for other applications in which a metal wire is to be arranged in an orderly manner on a metal core. In the first steps A) and B) of the method described above, a metal core may be produced. For the metal core, multiple metal plates may be provided in step A). The multiple metal plates may contain iron as the material due to its ferromagnetic properties. The metal plates may either be provided with the required outer contour or may be cut in the desired shape by a cutting process in step A), such as by stamping, from raw material. The metal plates may have an electrically insulating layer on one side. Such an electrically insulating layer may be applied in step A) of the method. In step B) of the method, the metal plates may then be assembled to form a metal core, which may also be called packing. In step B), at least one partial region of each metal plate may be plastically shaped, so that at least one connection element results from the shaped region. The metal plates may then be joined together in force-locking and/or form-fitting manner by the connection elements. One portion of the shaped region of a metal plate may be introduced into one portion of the shaped region of an adjacent metal plate. The metal plates may be joined together in a joining direction extending perpendicular to the largest surface of the metal plates. The plastically shaped region of each metal plate may be formed by a knob, for example. Each metal plate may be plastically shaped at multiple sites, in order to enable a joining of adjacent metal plates at multiple positions. In step C) of the method, a metal wire may then be wound around the joined metal plates. In this process, a multitude of windings may be applied alongside each other and, preferably, also on top of one another. The windings may be applied in a given order, in order to place as many windings as possible on the metal core in stable manner. For the orderly placement of the windings, the metal wire may be subjected to a tensile force, whereby the metal wire lies tight and without play on the metal core after the winding process. The windings put in place may encircle the metal core in different directions. One or more partial regions of each winding may be oriented in the joining direction running perpendicular to the metal plates. These partial regions of the windings, running parallel to the joining direction, gradually press the metal plates of the metal core further together during the winding process, such that its dimension in the joining direction is reduced. This reduced dimension of the metal core, which exists only after putting multiple windings in place, may cause the windings which were the first to be applied to be longer than the circumference of the metal core and to be loosened from the surface of the metal core. These first applied windings may be loose and no longer positioned firmly on the metal core. These loose windings may be especially problematical when windings need to be applied in a second layer. According to the present disclosure, this problem of loose windings is rectified by the method in that the metal wire is heated in step C) of the method prior to the winding of the metal core. Due to this heating, the length of the heated partial region of the metal wire is increased. This heated partial region may then be wound around the metal core in step C) of the method. As previously described, the dimensions of the metal core may be reduced when further windings are put in place, such that the first windings may become loose. The loosening of these first windings may be compensated according to the present disclosure in that the previously heated wire cools down after the winding process, such that its length is shortened. Due to this shrinkage of the wire during cooldown, the respective winding still lies firmly and orderly on the metal core even given the reduced outer dimensions of the metal core. This may enable an orderly placement of further layers of windings on the windings first installed. Thus, at the end of step C) of the method, an electromagnet is produced in which all the windings lie firmly on the metal core.

The method according to the present disclosure requires no additional elements, materials, or subsequent steps to stabilize the position of the windings of the metal wire. The heating of the metal wire prior to the winding process is technically simple and can be done, for example, by movement through a furnace. The subsequent winding process in step C) does not require steps to fix the position of the windings in place. No further steps are required after step C) of the method to secure the position of the windings. The method according to the present disclosure thus simplifies the production of a high-quality electromagnet in which all the windings of the metal wire are fixed in their position on the metal core.

In some embodiments, the metal wire may be subjected to a tensile force in step C) in order to cause the metal wire to lie against the surface of the metal core. In such embodiments, a tensile stress may be generated in the metal wire during the winding process. The tensile stress in the metal wire during the winding process may enable the windings to lie tight and directly against the surface of the metal core. In such embodiments, the windings may be positioned and fixed on the metal core by force-locking. Due to the tensile force in the windings, a compressive force may be exerted on the metal core.

In some embodiments, at least one knob may be embossed in the metal plate in step B) in order to deform the metal plate plastically in some areas. The knob may extend in the joining direction and the projecting region of the knob may be introduced into the embossed cavity of a knob of at least one adjacent metal plate in the joining direction. The knobs may be connected by form-fitting, force-locking, and fixing the adjacent metal plates to each other at least perpendicular to the joining direction. In such embodiments, knobs may be formed plastically in all the metal plates in step B) of the method. Multiple knobs staggered with respect to each other may be made in each metal plate. After this, the projecting region of one knob of a metal plate may be introduced into the embossed cavity of a knob of an adjacent metal plate, for example, by applying a pressing force, which presses the adjacent metal plates against each other. In this way, the projecting region of one knob is fixed by form-fitting and force-locking in the embossed cavity of a knob of the adjacent metal plate. Because of the elastic restoring force acting in the metal plates after being connected, there may be a distance between two adjacent metal plates, such that the adjacent metal plates do not lie directly on one another. In this way, the relative position of two adjacent metal plates may vary in the joining direction when a compressive force is applied from the joining direction. However, the connection between two adjacent knobs securely fixes adjacent metal plates in a direction perpendicular to the joining direction.

In some embodiments, the metal wire may be heated by exposure to infrared light, passage through a furnace, induction, or a combination of these, prior to the winding process in step C). The heating of the metal wire may be accomplished in various ways. The heating may occur shortly before performing step C) of the method, for example, not more than one minute prior to step C). The short time frame prior to step C) assists in causing the metal wire to be thermally lengthened when placed on the metal core. A simple and rapid heating may be achieved in embodiments in which the metal wire runs through a section of a furnace. Alternatively, the metal wire may be heated by radiation, induction, or a flame prior to the winding process.

In some embodiments, the metal wire may be heated to a temperature of at most 200° C., preferably to a temperature of at most 180° C., prior to the winding process in step C). The greater the heating prior to step C) of the method, the greater the thermal elongation of the metal wire as well. During the heating process, care should be taken to ensure the desired mechanical properties of the metal wire, such as tensile strength, do not change in an unwanted manner. If the temperature too high for the heating, textural changes may occur in the metal wire, which may change the tensile strength. Thus, the temperature to which the metal wire is heated should minimize changes which may occur in the mechanical properties after the cooldown. In the case of copper-containing metal wires, a heating to at most 200° C. may be suitable. Furthermore, the insulation applied to the metal wire may be considered. The metal wire may be insulated with an enamel or a combination of a plurality enamels. This enamel may contain, for example, polyamide-imide (PAI). Heating of the enamel beyond a limit temperature may result in unwanted accelerated aging of the enamel. Thus, in the case of metal wires insulated by enamel, a temperature that lies below the limit temperature for the unwanted accelerated aging of the enamel may be chosen for the heating prior to step C) of the method.

In some embodiments, the heating of the metal wire prior to the winding process may be reduced or ended during the winding of the metal wire around the assembled metal core in step C) after a limit number of windings has been applied. When applying the windings in step C) of the method, the metal core may be compressed with an increased force by each additional winding applied. In the beginning, this force introduced by the windings may press together the still elastically resilient metal plates of the metal core. At a limit number of windings put in place, there may no longer be any distance between the individual metal plates, and these metal plates then lie against each other in a block. Increasing the number of windings beyond the limit number may no longer result in a further reduction of the outer dimensions of the metal core. For this reason, at the limit number, no compensation for the compressing of the metal core may be needed by a shortening of the length of the windings with thermal shrinkage. It may be possible, after passing the limit number of windings, to reduce or end the heating of the metal wire. As the heating may be a slow process in which the heating cannot be ended at once, the heating of the wire may only be reduced as of the limit number. Alternatively, the metal wire may be heated after passing the limit number. In such embodiments, a larger mechanical stress may occur in the windings after the winding beyond the limit number in the cooled-down state than in the windings first installed. Prolonged heating of the metal wire beyond the limit number may reduce the tensile force applied to the metal wire prior to the winding process after passing the limit number, which may likewise result in reduction of the shrinkage and thus the stress in the metal wire after the cooldown.

Furthermore, after the packing in step B), distances may remain between the metal plates in the joining direction due to the form-fitting and/or force-locking connection of the shaped regions of the adjacent metal plates. During the winding of the metal core in step C) these distances between the metal plates may be reduced by the metal wire being applied under a tensile force. The limit number of the windings applied may correspond to the number of windings at which no further distances are present between the metal plates. The limit number of windings may be defined in that, upon reaching the limit number, no more distances exist between the metal plates and, thus, the metal core cannot be compressed any further in the joining direction. The greater the tensile force on the metal wire during the winding process, the lower the limit number.

In some embodiments, the metal wire may cool after being wound onto the metal core, whereupon the length of the metal wire decreases. Upon cooldown, the length of the metal wire may be reduced, such that the windings have a smaller circumferential length than in the heated state. In this way, the windings may lie firmly against the surface of the metal core even with its reduced dimensions. The cooling may occur passively in that the heat in the metal wire is given off to the surroundings or the metal core. Alternatively, the cooling may be active, in that the windings put in place are cooled by blowing cooling air or another coolant thereon.

The present disclosure further provides an electromagnet which is produced by a method according to one of the previously described embodiments. Due to production of the electromagnet by a method according to the present disclosure, the electromagnet is configured such that the windings lie firmly against the surface of the metal core and thus are fixed securely in position. Thus, the windings in the electromagnet according to the present disclosure may be applied to the metal core in a long-term stable and durable manner. The production of the electromagnet may be simple with low production costs due to the metal core being a pack of metal plates formed by shaping or stamping. An electromagnet according to the present disclosure may be used in various devices or appliances, such as the stator of an electric machine, the rotor of an electric machine, a transformer, or similar devices containing a coil applied to a metal core.

The present disclosure further provides a rotor of an electric, externally excited synchronous machine having at least one electromagnet according to the previously described embodiment, wherein the electromagnet forms a rotor pole. As strong mass forces may be acting on the rotating rotor during the operation of the electric machine, a secure fixation of the windings of the electromagnet in the rotor is of great importance. The electromagnets forming the rotor may be produced according to the method of the present disclosure, such that the windings may be securely positioned on the metal core in a simple manner. The rotor according to the present disclosure may be produced easily and economically with long-term operating stability when used in an electric machine. A stator of an electric machine as well as a transformer are also disclosed herein, each having at least one electromagnet according to the previously described embodiment.

Features, effects and benefits which are disclosed in connection with the method also apply in connection with the electromagnet and the rotor. The same holds conversely: features, effects and benefits which are disclosed in connection with the electromagnet and the rotor also apply in connection with the method.

BRIEF DESCRIPTION OF THE SEVERAL VIEWS OF THE DRAWINGS

The FIGURE shows a schematic view of three consecutive conditions during production of an electromagnet.

DETAILED DESCRIPTION

The FIGURE shows in a schematic view three consecutive conditions of an electromagnet 100 during its production according to one embodiment of the method according to the present disclosure. In the FIGURE, there can be seen, in succession from left to right, three conditions at different times during the performance of the method. In the view at the far-left, steps A) and B) of the method described above have already been performed. A metal core 1 includes multiple metal plates 11, which have been joined together in a force-locking and form-fitting manner by a shaping of partial regions of the metal plates 11. The joining direction FR extends perpendicular to the metal plates 11. At the lower edge of the metal core 1, black lines represent, as an example, three metal plates 11 arranged one on top of another. As can be seen, there is a distance between the metal plates 11 in each condition. In order to simplify the description, the distances between the metal plates 11 are shown larger than the distances may be in reality. The distances between the metal plates 11 may arise unintentionally during the joining together in step B) of the method. In the joining process, partial regions of the metal plates 11 may be plastically shaped, for example, in the form of knobs. Such a shaped region may be joined by force-locking and form-fitting to a likewise shaped region of an adjacent metal plate 11 in the direction of the joining direction FR. This joining process may occur by applying a compressive force in the joining direction FR. After the joining process, elastic restoration of the mutually joined regions of the adjacent metal plates 11 may occur. Thus, the joining sites or connection sites may act as springs in the joining direction FR, which may cause the adjacent metal plates 11 to not lie directly against each other. By applying a compressive force in the joining direction FR to the metal core 1, however, the distances between the metal plates 11 may be reduced or eliminated. The overall metal core 1 may act like an elastic spring in the joining direction after step B) of the method is performed. In the view at the far-left, a first winding 21 of a metal wire 2 has already been wound around the metal core 1. The winding of the metal wire 2 may occur under a tensile force, which is applied to the metal wire. This tensile force may cause the metal wire 2 in each winding turn 21 to lie flush against the outer surface of the metal core. In the view in the middle, further windings 21 have been applied to the metal core 1. Due to these windings, the metal core 1 may be elastically compressed, thereby reducing the distances between the metal plates 11 in the joining direction FR by the increment Δx. As shown in the middle view, the distances between the metal plates 11 as symbolized by the black lines have been reduced. The winding 21 first installed, situated at the far rear, has already become loose due to the reduced outer dimensions of the metal core 1 and is spaced apart from the outer surface of the metal core 1 as symbolized by the increment Δy. In the view at the far-right, further windings 21 have been wound around the metal core 1. As shown in the far-right view, there is no distance between the three metal plates 11 as symbolized by black lines. In the state shown in the far-right view, the force applied by the windings 21 to the metal core 1 is enough to compensate for the elastic restoring force at the connection sites between the metal plates 11, such that the metal plates 11 lie directly on top of one another with no distance therebetween. As shown in the far-right view, the increment of the dimension Δx in the joining direction FR has increased compared to the state shown in the middle view. However, if further windings 21 are applied, starting from the state shown at right, this increment Δx will not increase further, as there is no distance present between the metal plates 11. In the state shown at the far-right, the metal wire 2 of the winding 21 first installed now is spaced apart from the outer surface of the metal core 1 by a larger increment Δy. In the state shown at the farright, some of the windings first installed are positioned loosely and not firmly on the surface of the metal core 1. The loose windings may be rectified by the method according to the present disclosure in that the metal wire is heated prior to the winding process, i.e., in a state previous in time to the state in the far-left view, and in this way the metal wire increases in length. After being thermally lengthened, the metal wire 2 may then be wrapped around the elastically resilient metal core 1 as shown in the three views of the FIGURE. When the metal wire is still hot, the indicated loosening of the first windings 21 from the metal core 1 may occur. When the metal wire 2 then cools or is cooled in an additional step of the method, the length of the metal wire 2 will decrease. Due to this reduced length, the length or the circumference of each winding 21 already installed will also decrease, thereby compensating for the decreasing of the metal core 1 in the joining direction FR. Thus, after the cooling of the metal wire 2, the windings 21 first installed will also lie firmly against the surface of the metal core 1 with a reduced dimension in the joining direction FR. Due to this firm abutment, all of the windings 21 will be positioned and fixed securely on the metal core 1. In the state shown at the far-right, there are no longer any distances between the metal plates 11, such that the outer dimension of the metal core 1 cannot be further reduced by putting further windings 21 in place. The number of windings at which this state with no distances between the metal plates 11 is achieved is known as the limit number of windings 21. In some embodiments of the method, the heating of the metal wire 2 prior to its winding onto the metal core 1 may be reduced or completely ended upon reaching this limit number. A thermal shrinkage to compensate for a dimensional change of the metal core 1 is no longer necessary after passing the limit number in order to ensure a stable positioning of all the windings 21.

German patent application no. 102023104290.4, filed Feb. 22, 2023, to which this application claims priority, is hereby incorporated herein by reference, in its entirety.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for producing an electromagnet having a metal core and at least one metal wire, the method comprising:

joining a plurality of metal plates into the metal core by packing, wherein each metal plate includes plastically shaped areas and the plastically shaped areas of the metal plate are connected by force-locking and/or form-fitting to the plastically shaped area of at least one adjacent metal plate in a joining direction;

heating the at least one metal wire such that a length of the at least one metal wire is increased; and thereafter, winding the at least one metal wire around the metal core, wherein a multitude of windings are wound around the metal core, the windings being placed next to each other and/or on top of one another, and wherein a partial region of each winding is oriented parallel to the joining direction.

2. The method according to claim 1, wherein the at least one metal wire is subjected to a tensile force during the winding such that the at least one metal wire lies against a surface of the metal core.

3. The method according to claim 1, further comprising:

introducing a projecting region of at least one knob embossed in the plastically shaped areas of a metal plate extending in the joining direction into an embossed cavity of a knob of at least one adjacent metal plate in the joining direction, and connecting the at least one knob embossed in the plastically shaped areas of a metal plate and the knob of at least one adjacent metal plate by form-fitting, force-locking, and fixing the adjacent metal plates to each other at least perpendicular to the joining direction.

4. The method according to claim 1, wherein heating the at least one metal wire prior to the winding of the at least one metal wire around the metal core includes heating by at least one of exposure to infrared light, passage through a furnace, and induction.

5. The method according to claim 1, wherein heating the at least one metal wire prior to the winding of the at least one metal wire around the metal core includes heating the at least one metal wire to a temperature of at most 200° C.

6. The method according to claim 1, wherein heating the at least one metal wire prior to winding of the at least one metal wire around the metal core includes heating the at least one metal wire to a temperature of at most 180° C.

7. The method according to claim 1, further comprising: reducing or ending the heating of the at least one metal wire during the winding of the at least one metal wire around the metal core after a limit number of windings has been applied.

8. The method according to claim 7, wherein distances remain between the plurality of metal plates in the joining direction after the joining of the metal plates, wherein the distances between the plurality of metal plates are reduced by the at least one metal wire being subjected to a tensile force during the winding, and wherein the limit number of the windings applied is the number of windings at which no further distances are present between the plurality of metal plates.

9. The method according to claim 1, wherein the at least one metal wire cools after being wound on the metal core, such that a length of the at least one metal wire decreases.

10. An electromagnet produced by a method comprising:
joining a plurality of metal plates into a metal core by packing, wherein each metal plate includes plastically shaped areas and the plastically shaped areas of the metal plate are connected by force-locking and/or form-fitting to the plastically shaped areas of at least one adjacent metal plate in a joining direction;

heating at least one metal wire such that a length of the at least one metal wire is increased; and thereafter, winding at least one metal wire around the metal core, wherein a multitude of windings are wound around the metal core, the windings being placed next to each other and/or on top of one another, and wherein a partial region of each winding is oriented parallel to the joining direction.

11. A rotor of an electric, externally excited synchronous machine having at least one electromagnet produced by a method comprising:
joining a plurality of metal plates into a metal core by packing, wherein each metal plate includes plastically shaped areas and the plastically shaped areas of the metal plate are connected by force-locking and/or form-fitting to the plastically shaped areas of at least one adjacent metal plate in a joining direction;

heating at least one metal wire such that a length of the at least one metal wire is increased; and thereafter, winding at least one metal wire around the metal core, wherein a multitude of windings are wound around the metal core, the windings being placed next to each other and/or on top of one another, and wherein a partial region of each winding is oriented parallel to the joining direction, and wherein the electromagnet forms a rotor pole.

* * * * *